(12) United States Patent
Pascual et al.

(10) Patent No.: US 12,738,073 B2
(45) Date of Patent: Sep. 15, 2026

(54) SYSTEM AND METHOD FOR PEDESTRIAN PROJECTION

(71) Applicant: Toyota Jidosha Kabushiki Kaisha, Aichi-ken (JP)

(72) Inventors: Vincent Pascual, Dublin, CA (US); Anat Litan Sever, Sunnyvale, CA (US); Alexander Granieri, Mountain View, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/983,899

(22) Filed: Dec. 17, 2024

(65) Prior Publication Data

US 2026/0170846 A1 Jun. 18, 2026

(51) Int. Cl.

| | |
|---|---|
| ***G06V 20/58*** | (2022.01) |
| ***G06T 7/20*** | (2017.01) |
| ***G06T 7/70*** | (2017.01) |
| ***G06T 11/60*** | (2026.01) |
| ***G06T 13/80*** | (2011.01) |
| ***H04N 5/74*** | (2006.01) |

(52) U.S. Cl.

CPC ................ *G06V 20/58* (2022.01); *G06T 7/20* (2013.01); *G06T 7/70* (2017.01); *G06T 11/60* (2013.01); *G06T 13/80* (2013.01); *H04N 5/74* (2013.01)

(58) Field of Classification Search

CPC .. G06V 20/58; G06T 7/20; G06T 7/70; G06T 11/60; G06T 13/80; H04N 5/74

See application file for complete search history.

(56) References Cited

U.S. PATENT DOCUMENTS

| | | | |
|---|---|---|---|
| 9,589,464 | B2 | 3/2017 | Rovik et al. |
| 9,987,979 | B2 | 6/2018 | Kawamata et al. |
| 10,134,280 | B1 | 11/2018 | You |
| 10,308,172 | B2 | 6/2019 | Suzuki et al. |
| 10,311,718 | B2 | 6/2019 | Suzuki et al. |
| 10,607,416 | B2 | 3/2020 | Nowakowski et al. |

(Continued)

FOREIGN PATENT DOCUMENTS

| | | |
|---|---|---|
| DE | 102012023630 A1 | 6/2014 |
| DE | 102017103862 A1 | 8/2018 |

(Continued)

OTHER PUBLICATIONS

Vehicle-to-vehicle (V2V) communication https://my.avnet.com/abacus/solutions/markets/automotive-andtransportation/automotive/communications-and-connectivity/v2v-communication/, Sep. 22, 2024.

(Continued)

*Primary Examiner* — Michael E Teitelbaum

(74) *Attorney, Agent, or Firm* — DINSMORE & SHOHL LLP

(57) ABSTRACT

A vehicle system of a vehicle may comprise one or more processors configured to receive sensor data from one or more vehicle sensors as the vehicle drives along a road, determine a location of a pedestrian based on the sensor data, perform vehicle-to-vehicle communication with a second vehicle indicating the location of the pedestrian, project an image onto the road based on the location of the pedestrian, determine movement of the pedestrian, and modify the image being projected onto the road based on the movement of the pedestrian.

20 Claims, 8 Drawing Sheets

(56) References Cited

U.S. PATENT DOCUMENTS

| | | | | |
|---|---|---|---|---|
| 10,740,796 | B2 | 8/2020 | Brubaker | |
| 10,836,313 | B2 | 11/2020 | Nowakowski et al. | |
| 11,037,382 | B2 | 6/2021 | Lei et al. | |
| 11,095,307 | B2 | 8/2021 | Miele | |
| 11,244,562 | B2 | 2/2022 | Tamura et al. | |
| 11,305,688 | B2 * | 4/2022 | Stein | H04W 4/46 |
| 2020/0198534 | A1 | 6/2020 | Ito et al. | |
| 2021/0197846 | A1 * | 7/2021 | Thakur | B60Q 1/545 |
| 2023/0051632 | A1 | 2/2023 | Bellare et al. | |
| 2023/0059897 | A1 | 2/2023 | Miucic et al. | |
| 2023/0249614 | A1 * | 8/2023 | Kim | B60Q 1/535<br>340/468 |

FOREIGN PATENT DOCUMENTS

| | | | |
|---|---|---|---|
| EP | 3385931 | B1 | 7/2022 |
| JP | 2006277538 | A | 10/2006 |
| WO | 2017102259 | A1 | 6/2017 |
| WO | 2020210338 | A1 | 10/2020 |
| WO | 2024189619 | A1 | 9/2024 |

OTHER PUBLICATIONS

Using Vehicle-to-Vehicle Communication to Improve Traffic Safety in Sand-dust Environment https://www.ncbi.nlm.nih.gov/pmc/articles/PMC7068630/, Feb. 12, 2020.

* cited by examiner

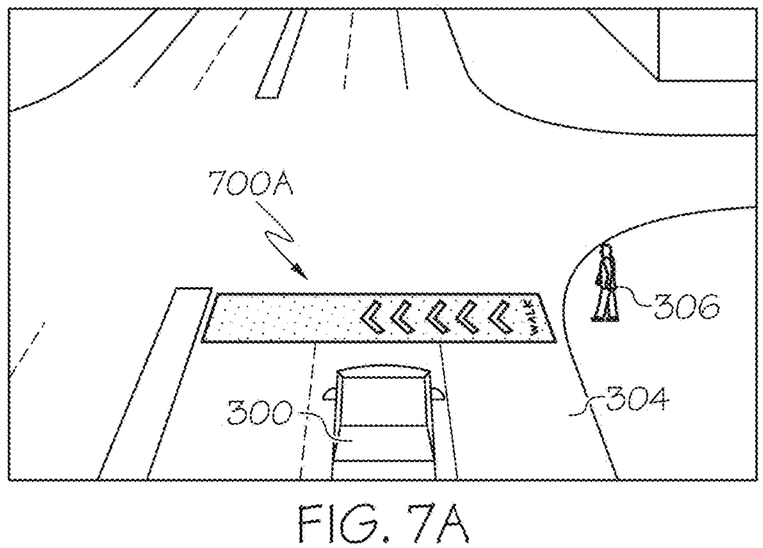
FIG. 7A
700B
WALK
306
300
304
FIG. 7B
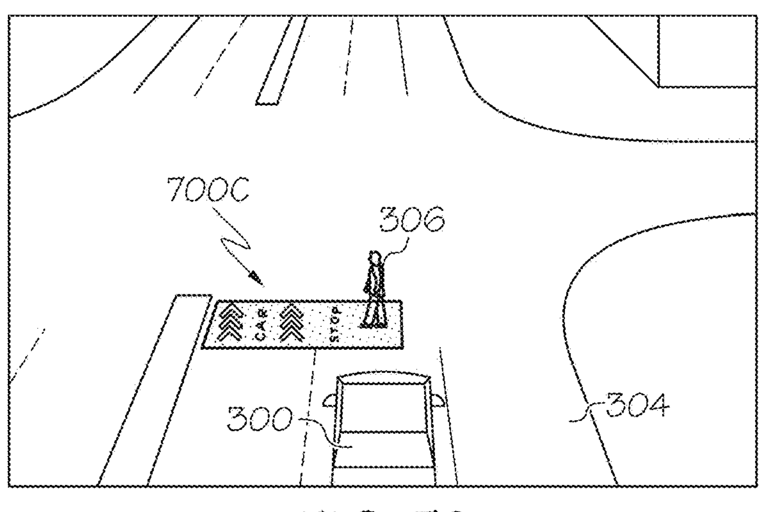
FIG. 7C

SYSTEM AND METHOD FOR PEDESTRIAN PROJECTION

TECHNICAL FIELD

The present specification relates to vehicle systems, and more particularly, to a system and method for pedestrian projection.

BACKGROUND

Many modern vehicles are able to communicate with each other through various communications technologies. As such, vehicles may be able to warn each other about pedestrians and other road obstacles. Accordingly, a need exists for a system and method for pedestrian projection.

SUMMARY

In an embodiment, a vehicle system of a vehicle may include one or more processors configured to receive sensor data from one or more vehicle sensors as the vehicle drives along a road, determine a location of a pedestrian based on the sensor data, perform vehicle-to-vehicle communication with a second vehicle indicating the location of the pedestrian, project an image onto the road based on the location of the pedestrian, determine movement of the pedestrian, and modify the image being projected onto the road based on the movement of the pedestrian.

In another embodiment, a method may include receiving sensor data from one or more vehicle sensors of a vehicle as the vehicle drives along a road, determining a location of a pedestrian based on the sensor data, performing vehicle-to-vehicle communication with a second vehicle indicating the location of the pedestrian, projecting an image onto the road based on the location of the pedestrian, determining movement of the pedestrian, and modifying the image being projected onto the road based on the movement of the pedestrian.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 7A depicts an example image that may be generated by the vehicle system of FIG. 1, according to one or more embodiments shown and described herein;

FIG. 7B depicts another example image that may be generated by the vehicle system of FIG. 1, according to one or more embodiments shown and described herein;

FIG. 7C depicts another example image that may be generated by the vehicle system of FIG. 1, according to one or more embodiments shown and described herein.

DETAILED DESCRIPTION

The embodiments disclosed herein include a system and method for pedestrian projection. As a vehicle drives along a road, vehicle sensors may be used to detect the presence and motion of a pedestrian. The vehicle may then communicate with another vehicle (e.g., via vehicle-to-vehicle (V2V) communication) to alert the other vehicle of the presence of the pedestrian. The two vehicles may then project an image onto the road to indicate whether it is safe for the pedestrian to cross the road or whether the pedestrian should not cross the road. As the pedestrian walks across the road, the projection may change. By detecting a pedestrian and projecting an image onto a road based on the location of the pedestrian, a vehicle system may make other vehicles more aware of pedestrians, and may make pedestrians more aware of other vehicles. Furthermore, by modifying a projected image based on the movement of the pedestrian, a projected image may dynamically respond to changing conditions, such as newly detected vehicles or unexpected movement of the pedestrian. Accordingly, overall traffic flow may be improved.

Figure 1:
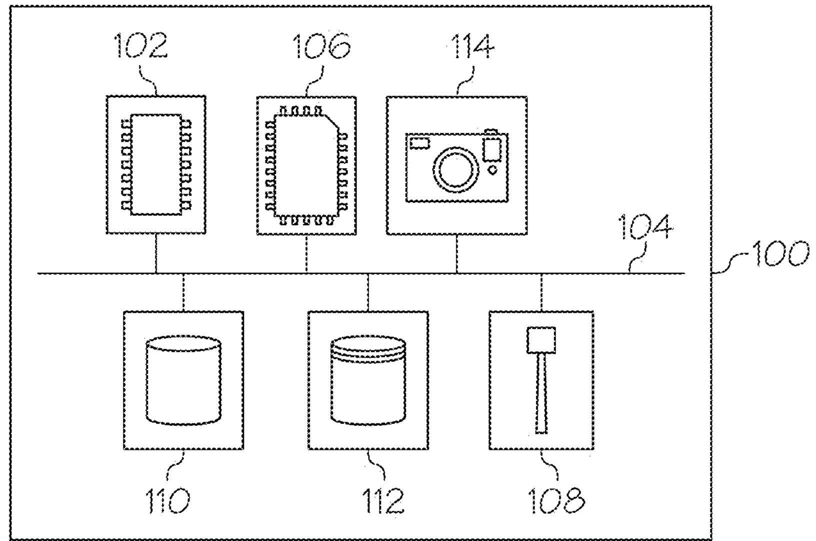
FIG. 1 schematically depicts a vehicle system, according to one or more embodiments shown and described herein.

Turning now to the figures, FIG. 1 depicts an example vehicle system 100 that may be included in a vehicle. In the example of FIG. 1, the vehicle system 100 includes one or more processors 102, a communication path 104, one or more memory modules 106, a satellite antenna 108, one or more vehicle sensors 110, a data storage component 112, and one or more projection devices 114, the details of which will be set forth in the following paragraphs.

Each of the one or more processors 102 may be any device capable of executing machine readable and executable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the vehicle system 100. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as Wi-Fi, Bluetooth®, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 100 includes one or more memory modules 106 coupled to the communication path 104. The one or more memory modules 106 may comprise RAM, ROM, flash memories, hard drives, or any device capable of storing machine readable and executable instructions such that the machine readable and executable instructions can be accessed by the one or more processors 102. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 106. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 1, the vehicle system 100 comprises a satellite antenna 108 coupled to the communication path 104 such that the communication path 104 communicatively couples the satellite antenna 108 to other modules of the vehicle system 100. The satellite antenna 108 is configured to receive signals from global positioning system satellites. Specifically, in one embodiment, the satellite antenna 108 includes one or more conductive elements that interact with electromagnetic signals transmitted by global positioning system satellites. The received signal is transformed into a data signal indicative of the location (e.g., latitude and longitude) of the satellite antenna 108, and consequently, the vehicle containing the vehicle system 100.

The vehicle system 100 comprises one or more vehicle sensors 110. Each of the one or more vehicle sensors 110 is coupled to the communication path 104 and communicatively coupled to the one or more processors 102. The one or more vehicle sensors 110 may include, but are not limited to, LiDAR sensors, RADAR sensors, optical sensors (e.g., cameras, laser sensors), proximity sensors, location sensors (e.g., GPS modules), and the like. In some examples, the vehicle sensors 110 may collect data that may be used to perform autonomous driving functions.

Still referring to FIG. 1, the vehicle system 100 comprises a data storage component 112. The data storage component 112 may store data used by various components of the vehicle system 100. In addition, the data storage component 112 may store data collected by the vehicle sensors 110.

The vehicle system 100 comprises one or more projection devices 114. The one or more projection devices 114 may project images onto a road. The one or more projection devices 114 may be located in a variety of locations on a vehicle to project images in a variety of directions. For example, a projection device 114 at the front of a vehicle may project images in front of the vehicle, a projection device 114 at the side of a vehicle may project images to the side of the vehicle, and a projection device 114 at the rear of a vehicle may project images behind the vehicle.

In embodiments, the one or more projection devices 114 may project various images onto the road. For example, an image may be generated by the vehicle system 100 (e.g., on a display screen), and a light source may be shined on the image to project the image onto the road. In some examples, rather than projecting an image onto the road, the one or more projection devices 114 may project an image onto other surfaces (e.g., a window of the vehicle, road signs, buildings or road infrastructure, and the like). The images projected by the one or more projection devices 114 may comprise a variety of shapes, text, and colors. In some examples, the projected image may be animated. The images that may be projected by the one or more projection devices 114 are discussed in further detail below.

Figure 2:
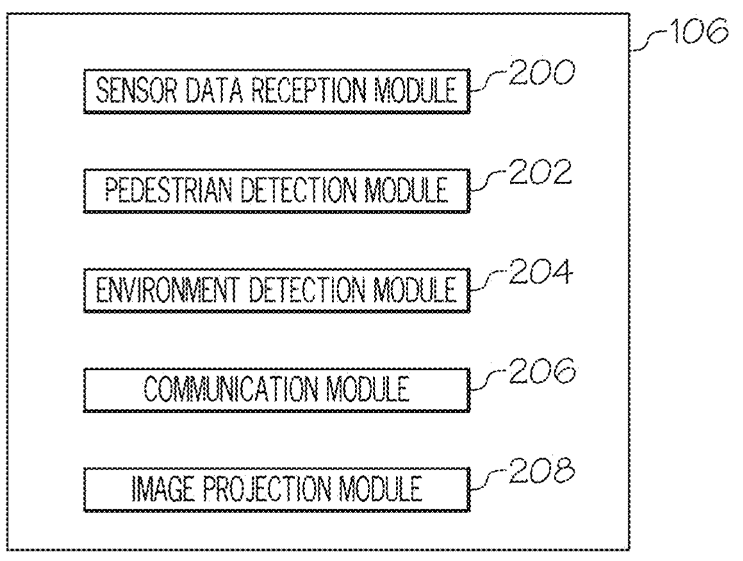
FIG. 2 depicts memory modules of the vehicle system of FIG. 1, according to one or more embodiments shown and described herein.

Now referring to FIG. 2, the memory modules 106 of the vehicle system 100 are schematically shown. The one or more memory modules 106 include a sensor data reception module 200, a pedestrian detection module 202, an environment detection module 204, a communication module 206, and an image projection module 208. Each of the sensor data reception module 200, the pedestrian detection module 202, the environment detection module 204, the communication module 206, and the image projection module 208 may be a program module in the form of operating systems, application program modules, and other program modules stored in the one or more memory modules 106. In some embodiments, the program module may be stored in a remote storage device that may communicate with the vehicle system 100. Such a program module may include, but is not limited to, routines, subroutines, programs, objects, components, data structures and the like for performing specific tasks or executing specific data types as will be described below.

The sensor data reception module 200 may receive data from the vehicle sensors 110, as disclosed herein. As discussed above, the vehicle sensors 110 may comprise a variety of sensor types such as a camera, Lidar, Radar, and the like. The vehicle sensors 110 may capture image, Lidar, Radar, or other data, which may be received by the sensor data reception module 200. The received data may indicate information about a vehicle's surrounding environment. In particular, the sensor data may capture an image or other data regarding pedestrians in the vicinity of the vehicle. In some examples, the sensor data may indicate environmental conditions around a vehicle (e.g., weather, visibility, and the like). The sensor data received by the sensor data reception module 200 may be used by the vehicle system 100 to identify pedestrians and/or environmental conditions around the vehicle, as described in further detail below.

Referring still to FIG. 2, the pedestrian detection module 202 may identify one or more pedestrians based on the sensor data received by the sensor data reception module 200, as disclosed herein. In particular the pedestrian detection module 202 may determine a location of a pedestrian and may determine movement of the pedestrian. In embodiments, the pedestrian detection module 202 may analyze the sensor data received by the sensor data reception module 200, and identify the location and movement of pedestrians using a variety of image processing or other techniques.

Figure 3:
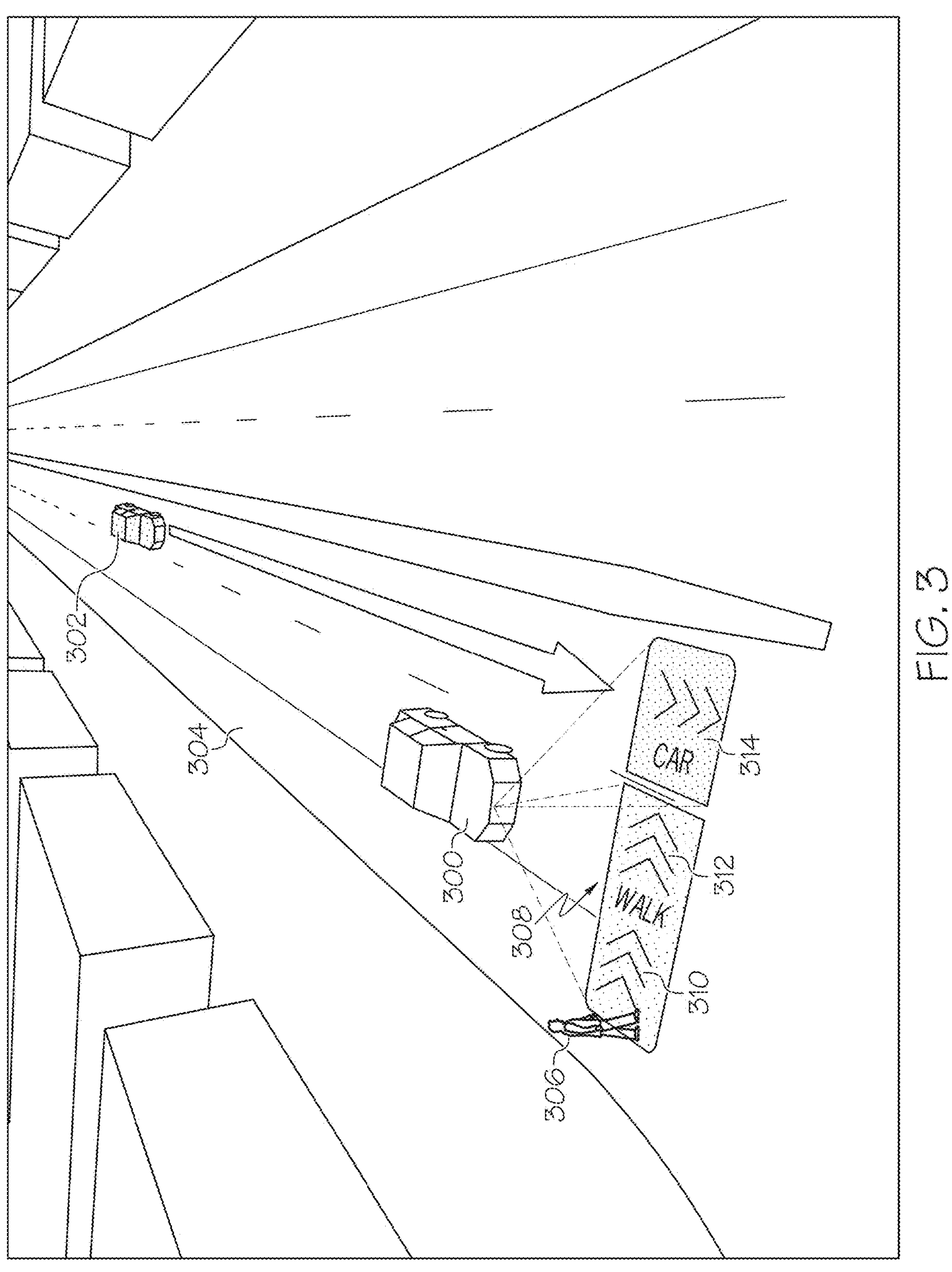
FIG. 3 depicts an example situation for performing pedestrian projection, according to one or more embodiments shown and described herein.

FIG. 3 shows an example in which vehicles 300 and 302 drive along a road 304 approaching a pedestrian 306 crossing the road 304. The vehicle 300 and/or the vehicle 302 may comprise the vehicle system 100 of FIG. 1. In the example of FIG. 3, the sensor data reception module 200 of the vehicle 300 may receive sensor data captured by the vehicle sensors 110 of the vehicle 300. The pedestrian detection module 202 of the vehicle 300 may detect the pedestrian 306. The pedestrian detection module 202 may determine the location of the pedestrian 306, and may continue to monitor the location of the pedestrian 306 as he or she walks across the road 304.

Referring back to FIG. 2, the environment detection module 204 may determine one or more environmental conditions around a vehicle based on the sensor data received by the sensor data reception module 200, as disclosed herein. The environment detection module 204 may identify environmental conditions using a variety of image processing or other techniques. The environment detection module 204 may identify a variety of environmental conditions such as, for example, weather conditions (e.g., rain, snow, fog, and the like), lighting or visibility conditions, road irregularities (e.g., potholes or obstructions), and the like.

In some examples, the environment detection module 204 may detect the presence of other vehicles or other road agents based on the sensor data received by the sensor data reception module 200. In the example of FIG. 3, the environment detection module 204 of the vehicle 300 may detect the vehicle 302 approaching from behind the vehicle 300 along the road 304.

Referring back to FIG. 2, the communication module 206 may perform vehicle-to-vehicle (V2V) communication between two or more vehicles, as disclosed herein. In the example of FIG. 3, the communication module 206 may perform V2V communication between the vehicle 300 and the vehicle 302. That is, each of the vehicles 300, 302 may have the vehicle system 100, and the communication module 206 of the vehicle 300 may communicate with the communication module 206 of the vehicle 302. In particular, the communication module 206 may perform V2V communication with another vehicle indication the location of the pedestrian In embodiments, the communication module 206 may transmit and/or receive data to and/or from another vehicle. In particular, the communication module 206 of one vehicle may transmit location information of a pedestrian to another vehicle. In the example of FIG. 3, the communication module 206 of vehicle 300 may transmit the location of the pedestrian 306 to the vehicle 302. As the pedestrian 306 moves across the road 304, the pedestrian detection module 202 may continue to monitor and detect the location of the pedestrian 306, and the communication module 206 may continually transmit the location of the pedestrian 306 to the vehicle 302. This may allow the vehicle 302 to be aware of the location of the pedestrian 306 even when the pedestrian 306 cannot be detected by the vehicle sensors 110 of the vehicle 302.

In another example, the communication module 206 transmits information about one or more environmental conditions determined by the environment detection module 204 to another vehicle. For example, the environment detection module 204 of a first vehicle may determine that the sun is shining on the first vehicle's blinker, thereby causing a glare or reflection making it difficult for a driver of a second vehicle to see the first vehicle's blinker. Accordingly, the communication module 206 of the first vehicle may transmit information about the determined glare or reflection to the second vehicle to make the driver of the second vehicle aware of the situation. For example, the second vehicle may display a notification as to the blinker of the first vehicle, or provide an audible notification of the blinker of the first vehicle via a speaker of the second vehicle. Accordingly, the driver of the second vehicle may be more careful maneuvering around the first vehicle.

In another example, upon the above determination that the driver of the second vehicle may have difficulty seeing a blinker of the first vehicle, the communication module 206 of the first vehicle may transmit information about usage of the blinker to the second vehicle. As such, the driver of the second vehicle may be aware of the first vehicle's intention even if the driver cannot directly see the blinker. For example, if the first vehicle is planning to change lanes in front of the second vehicle, the communication module 206 of the first vehicle may transmit information about the intention of the first vehicle to make this lane change to the second vehicle. As such, the driver of the second vehicle may become aware of the intended lane change of the first vehicle, even if the driver of the second vehicle cannot clearly see the blinker of the first vehicle.

Referring back to FIG. 2, the image projection module 208 may project an image onto the road, as disclosed herein. In particular, when the pedestrian detection module 202 detects a pedestrian, the image projection module 208 may cause the one or more projection devices 114 to project an image onto the road based on the location of the pedestrian. Furthermore, as the pedestrian detection module 202 detects movement of a pedestrian, the image projection module 208 may cause the one or more projection devices 114 to modify the image being projected onto the road based on the movement of the pedestrian.

In embodiments, the image projection module 208 may cause the one or more projection devices 114 to project a variety of images onto the road. In one example, the image projection module 208 may cause the one or more projection devices 114 to project an image indicating a path for a pedestrian to cross the road. In another example, the image projection module 208 may cause the one or more projection devices 114 to project an image indicating the presence of another vehicle to a pedestrian.

FIG. 3 shows an example image 308 that may be projected by the one or more projection devices 114 of the vehicle 300 onto the road 304. In the example of FIG. 3, the image 308 comprises a first portion 310, a second portion 312, and a third portion 314. The first portion 310 of the image 308 shows green arrows and the word "WALK" indicating that it is safe for the pedestrian 306 to walk along this portion of the image 308. The second portion 312 of the image 308 shows yellow arrows indicating that the pedestrian 306 should be cautions. The third portion 314 of the image 308 shows red arrows and the word "CAR" indicating that the vehicle 302 is approaching this portion of the road 304. As such, the image 308 may make the pedestrian 306 aware of where it is safe to cross the road 304.

Figure 4:
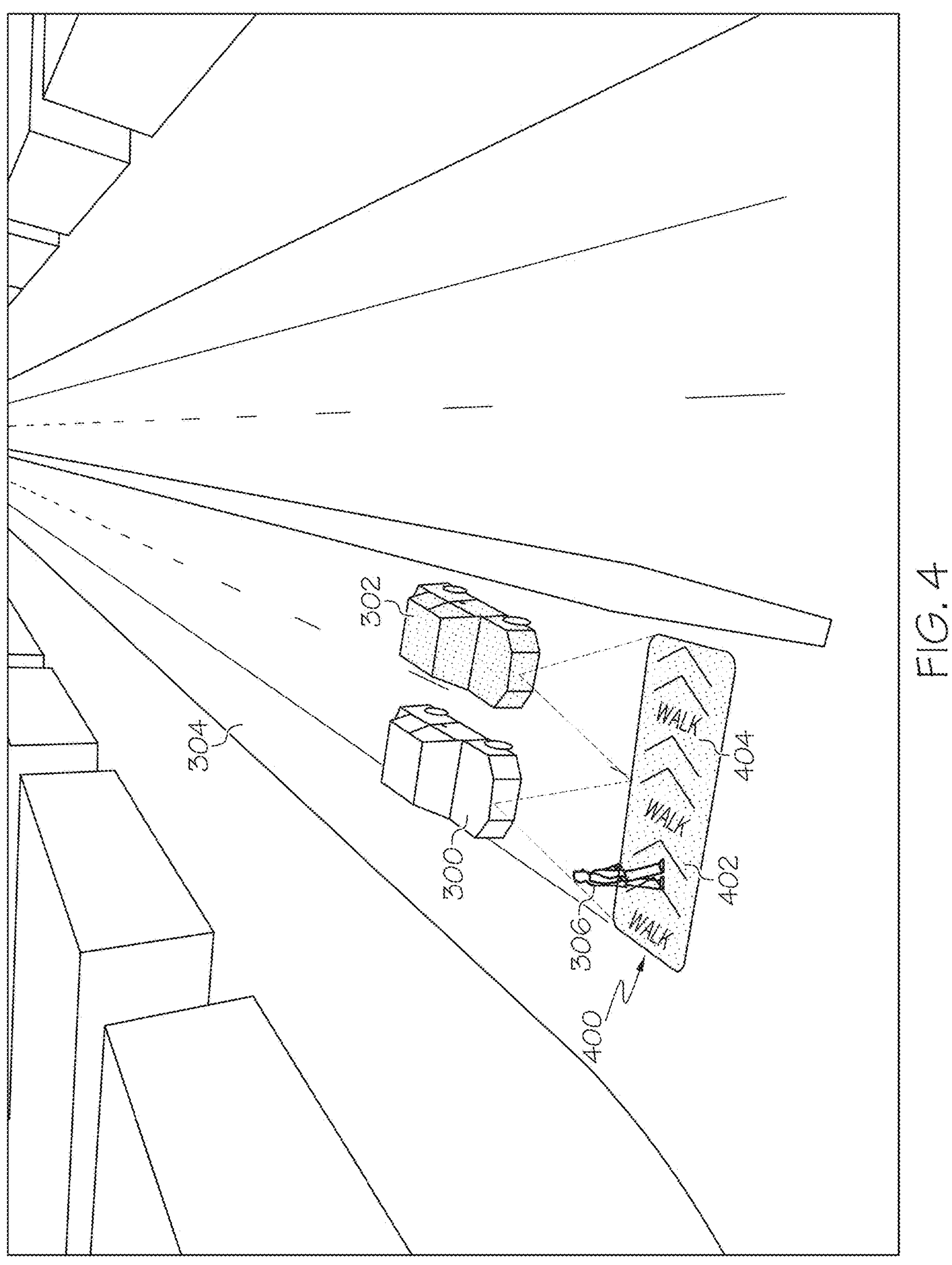
FIG. 4 depicts another example situation for performing pedestrian projection, according to one or more embodiments shown and described herein.

In some examples, two or more vehicles may jointly project a synchronized image onto the road. In particular, two vehicles may communicate via V2V communication, by the communication module 206 of each vehicle, and may coordinate a synchronized image to be projected onto the road, by the image projection module 208 of each vehicle. FIG. 4 shows an example in which the vehicle 300 and the vehicle 302 jointly project a synchronized image 400 onto the road 304. In the example of FIG. 4, both vehicles 300, 302 are stopped to allow the pedestrian 306 to cross the road 304. As such, the vehicles 300, 302 jointly project the synchronized image 400 comprises green arrows with the word "WALK" indicating that the pedestrian 306 may walk across the road 304. In the example of FIG. 4, the vehicle 300 projects a first portion 402 of the synchronized image 400 onto the road 304, and the vehicle 302 projects a second portion 404 of the synchronized image 400 onto the road 304.

In some examples, the image projection module 208 of a vehicle may cause the one or more projection devices 114 to project an image behind the vehicle to indicate the location of a pedestrian detected by the pedestrian detection module 202. In some examples, the image projection module 208 of a vehicle may cause the one or more projection devices 114 to project an image to a side of the vehicle to indicate the location of a pedestrian detected by the pedestrian detection module 202.

Figure 5:
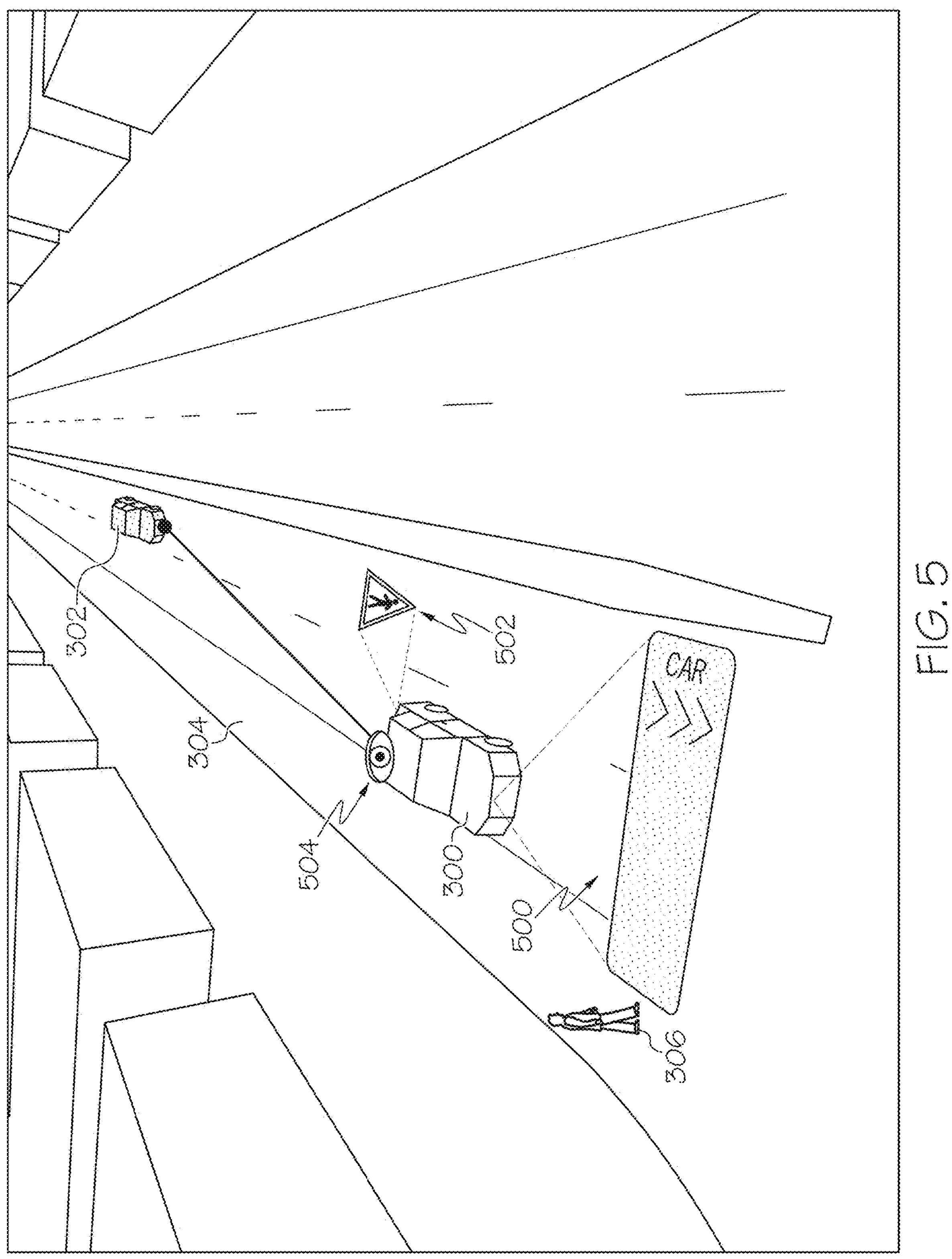
FIG. 5 depicts another example situation for performing pedestrian projection, according to one or more embodiments shown and described herein.

FIG. 5 illustrates an example situation in which a vehicle may project images in front of, behind, and to the side of the vehicle. In the example of FIG. 5, the vehicle 300 is stopped on the road 304 while the pedestrian 306 crosses the road 304. In the example of FIG. 5, the pedestrian detection module 202 of the vehicle 300 may detect the pedestrian 306 and the environment detection module 204 of the vehicle 300 may detect the vehicle 302. Based on these detections, the image projection module 208 of the vehicle 300 may cause the one or more projection devices 114 of the vehicle 300 to project an image 500 onto the road 304. In the example of FIG. 5, the image 500 may comprise red arrows and may include the word "CAR" indicating the presence of the vehicle 302 to the pedestrian 306. The arrows of the image 500 may point in the direction of travel of the detected vehicle 302.

As shown in FIG. 5, the vehicle 300 may also project an image 502 onto the road 304 to the side of the vehicle 300. The image 502 may comprise an image or symbol indicating the presence of a pedestrian (e.g., an image similar to a pedestrian crossing sign). The image 502 may indicate the presence of the pedestrian 306 to the vehicle 302. The image 502 may change based on the position of the pedestrian 306. In some examples, the image 302 may comprise a 3D render or animation.

Also in the example of FIG. 5, the vehicle 300 may project an image 504 behind the vehicle 300. In some examples, the vehicle 300 may project the image 504 onto the road 304 behind the vehicle 300. In other examples, the vehicle 300 may project the image 504 onto the rear windshield of the vehicle 300 such that a driver of the vehicle 302 can see the image 504 as the vehicle 302 approaches the vehicle 300. In some examples, the vehicle 300 may transmit the image 504 to the vehicle 302 via the communication module 206 using V2V communication, and the image 504 may be displayed on an internal display in the vehicle 302 so that it may be seen by the driver of the vehicle 302. In other examples, the vehicle 300 may transmit data about the pedestrian 306, via the communication module 206 using V2V communication, to the vehicle 302, and a vehicle system of the vehicle 302 may generate the image 504 and display the image on an internal display of the vehicle 302. For example, the communication module 206 may transmit the location of the pedestrian determined by the pedestrian detection module 202 to the vehicle 302. The vehicle 302 may receive this information and display information about the location of the pedestrian to the driver of the vehicle 302.

Figure 6:
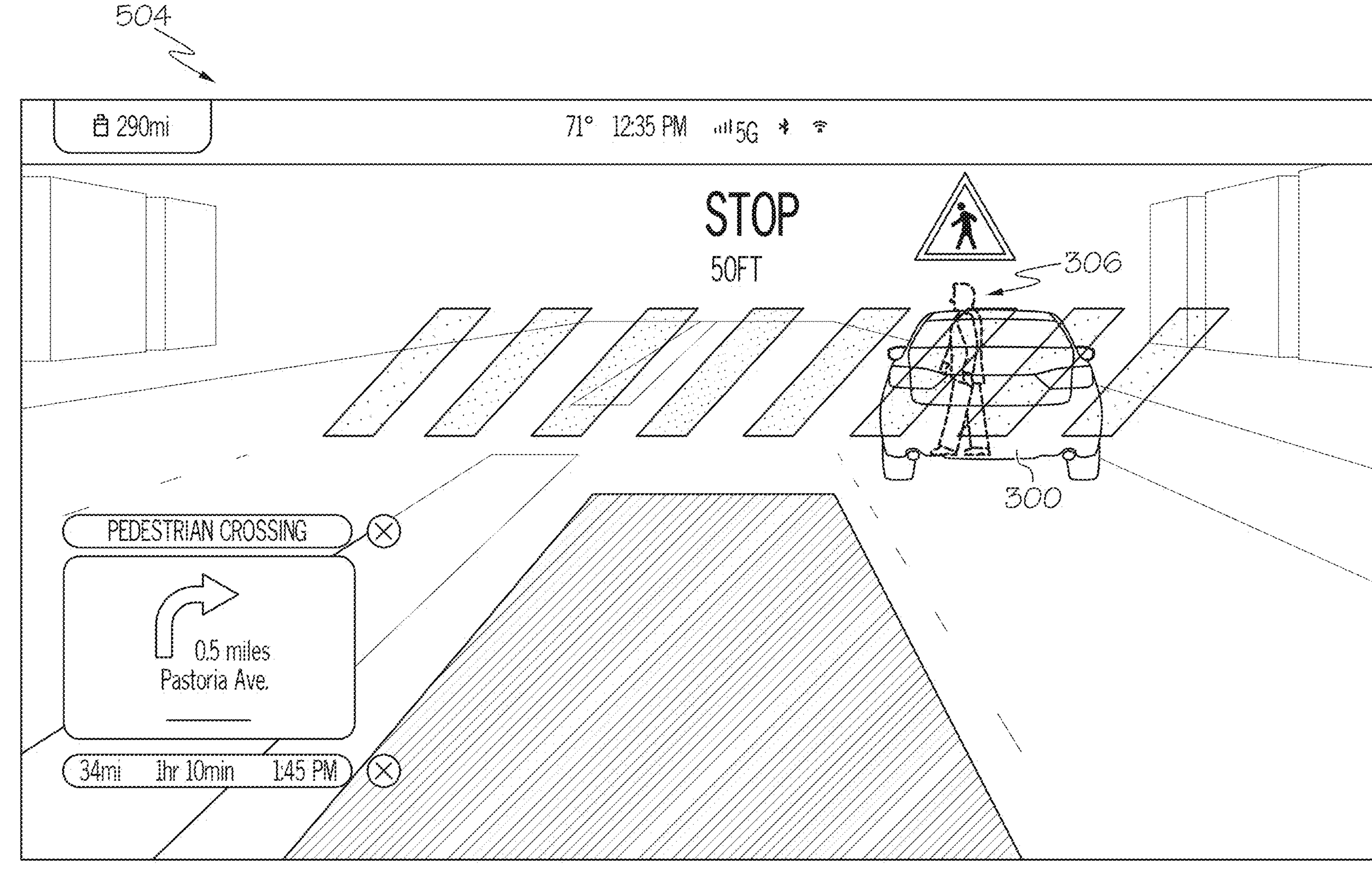
FIG. 6 depicts an example image that may be generated by the vehicle system of FIG. 1, according to one or more embodiments shown and described herein.

In some examples,

FIG. 6 shows an example image 504 that may be projected onto the road 304, onto a rear windshield of the vehicle 300, or displayed on an internal display of the vehicle 302 (e.g., on a head unit). As shown in FIG. 6, the image 504 shows the vehicle 300 and the pedestrian 306. As such, the image 504 allows the driver of the vehicle 302 to see the pedestrian 306 even though a line of sight of the pedestrian 306 is blocked by the vehicle 300. Accordingly, the image 504 allows the driver of the vehicle 302 to "see through" the vehicle 300. In the example of FIG. 6, the image 504 includes the text "STOP 50 FT" indicating that the pedestrian 306 is 50 feet ahead of the vehicle 302, and that the vehicle 302 should stop to avoid a collision with the pedestrian 306.

As discussed above, the image projection module 208 may cause the one or more projection devices 114 to modify the image being projected onto the road based on the movement of the pedestrian. For example, FIGS. 7A-7C show an example situation in which an image projected onto the road may be modified.

In the example of FIG. 7A, the vehicle 300 is stopped along the road 304 as the pedestrian is getting ready to cross the road 304. The vehicle 300 projects an image 700A across the road 304 in front of the vehicle 300 with green arrows and the word "WALK" indicating that the pedestrian 306 may cross the road 304. The arrows of the image 700A may point in the direction of travel of the pedestrian 306 across the road 304. In the example of FIG. 7A, the projected image 700A spans the entire width of the road 304.

In the example of FIG. 7B, the pedestrian 306 starts to cross the road 304. Accordingly, as the pedestrian 306 walks across the road 304, the vehicle 300 modifies the projected image 700A to image 700B such that the projected image only spans the width of the road 304 that the pedestrian 306 has not yet crossed. As shown in FIG. 7B, the projected image 700B does not span the portion of the road 304 behind the pedestrian 306 that the pedestrian 306 has already crossed.

As the pedestrian 306 continues to traverse the road 304, the vehicle 300 may continue to modify the projected image to only span the portion of the road 304 that the pedestrian still has to cross. However, in the example of FIG. 7C, the vehicle 300 detects another vehicle approaching the intersection. As such, as shown in FIG. 7C, the vehicle 300 modifies the project image 700B to become image 700C, which includes the text "STOP" and "CAR". The image 700C may also change the direction of the arrows from the images 700A, 700B of FIGS. 7A and 7B and may change the color of the arrows from green to red. In particular, the arrows of FIGS. 700A and 700B may point in the direction of travel of the pedestrian 306 across the road 304, while the arrows of FIG. 700C may point in the direction of travel of the detected vehicle approaching the intersection. As such, this may encourage the pedestrian 306 to stop in order to avoid a potential collision with the approaching vehicle.

In some examples, the image projection module 208 may cause the one or more projection devices 114 to animate the projected image. In these examples, the image projection module 208 may modify the animation of the image based on the movement of a detected pedestrian and the location of a detected vehicle. For example, in the examples of FIGS. 7A and 7B, the image projection module 208 may cause the arrows of FIGS. 700A and 700B to move in the direction that the pedestrian 306 is walking across the road 304. In some examples, the speed that the arrows move may be based on a speed at which the pedestrian 306 is crossing the road 304.

In another example, such as the example of FIG. 7C, the image projection module 208 may cause the projected image 700C to blink in order to get the attention of the pedestrian 306 about the approaching vehicle. If the vehicle continues approaching the intersection and the pedestrian 306 continues walking, the image projection module 208 may cause the projected image 700C to blink with an increasing frequency in order to indicate the increasing danger to the pedestrian 306. In some examples, the vehicle 300 may also output an audible warning along with the projected image 700C to get the attention of the pedestrian 306. In some examples, the projected image 700C or the audible warning may change based on urgency. In some examples, the projected image 700C may change based on a speed or braking status of the approaching vehicle. In some examples, the projected 700C or the audible warning may notify the pedestrian 306 if the approaching vehicle may pose a risk to the pedestrian 306 (e.g., due to not braking with the appropriate haste).

Figure 8:
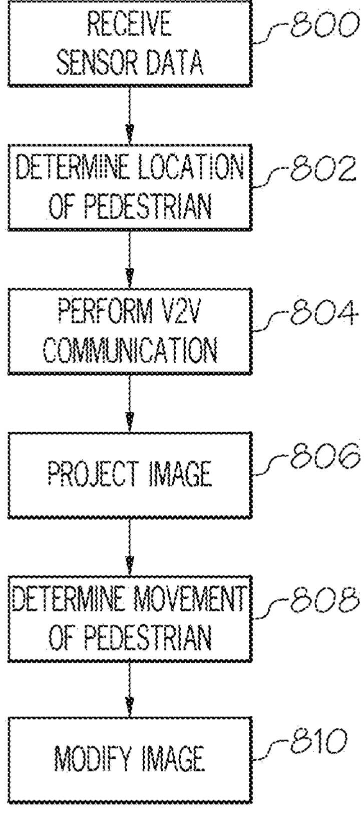
FIG. 8 depicts a flowchart of an example method that may be performed by the vehicle system of FIG. 1, according to one or more embodiments shown and described herein.

FIG. 8 depicts a flowchart of an example method that may be performed by the vehicle system 100 of FIG. 1. At step 800, the sensor data reception module 200 receives sensor data captured by the one or more vehicle sensors 110 of a vehicle as the vehicle drives along a road. For example, the sensor data reception module 200 of the vehicle 300 may receive sensor data captured by the one or more vehicle sensors 110 of the vehicle 300 as the vehicle 300 drives along the road 304, in the example of FIG. 3.

At step 802, the pedestrian detection module 202 determines a location of a pedestrian based on the sensor data received by the sensor data reception module 200. For example, the pedestrian detection module 202 of the vehicle 300 may determine the location of the pedestrian 306, in the example of FIG. 3.

At step 804, the communication module 206 performs V2V communication with a second vehicle indicating the location of the pedestrian determined by the pedestrian detection module 202. For example, the communication module 206 of the vehicle 300 may transmit the location of the pedestrian 306 to the vehicle 302, in the example of FIG. 3.

At step 806, the image projection module 208 projects an image onto the road based on the location of the pedestrian determined by the pedestrian detection module 202. In particular, the image projection module 208 may cause the one or more projection devices 114 to project the image onto the road. For example, the image projection module 208 may cause the one or more projection devices 114 to project the image 308 onto the road 304, in the example of FIG. 3.

At step 808, the pedestrian detection module 202 determines movement of pedestrian. For example, the pedestrian detection module 202 of the vehicle 300 may monitor the movement of the pedestrian 306 across the road 304, in the example of FIG. 3.

At step 810, the image projection module 208 modifies image projected onto the road based on the movement of the pedestrian. In particular, the image projection module 208 may cause the one or more projection devices 114 to modify the image being projected onto the road. For example, as the pedestrian 306 crosses the road 304, in the example of FIG. 3, the image projection module 208 may modify the image 308 being projected onto the road 304 based on the movement of the pedestrian 306.

It should now be understood that embodiments described herein are directed to a system and method for pedestrian projection. By detecting a pedestrian and projecting an image onto a road based on the location of the pedestrian, a vehicle system may make other vehicles more aware of pedestrians, and may make pedestrians more aware of other vehicles. Furthermore, by modifying a projected image based on the movement of the pedestrian, a projected image may dynamically respond to changing conditions, such as newly detected vehicles or unexpected movement of the pedestrian. Accordingly, overall traffic flow may be improved.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle system of a vehicle comprising one or more processors configured to:
- receive sensor data from one or more vehicle sensors as the vehicle drives along a road;
- determine a location of a pedestrian based on the sensor data;
- perform vehicle-to-vehicle communication with a second vehicle indicating the location of the pedestrian;
- project an image onto the road based on the location of the pedestrian such that the image spans a width of the road;
- determine movement of the pedestrian; and
- as the pedestrian crosses the road, modify the image being projected onto the road based on the movement of the pedestrian such that the modified image only spans a portion of the width of the road that the pedestrian has not crossed.

2. The vehicle system of claim 1, wherein the image indicates a path for the pedestrian to cross the road.

3. The vehicle system of claim 1, wherein the image indicates that the pedestrian should not cross the road.

4. The vehicle system of claim 1, wherein the image indicates the presence of the second vehicle to the pedestrian.

5. The vehicle system of claim 1, wherein the image is a synchronized image generated by the vehicle and the second vehicle.

6. The vehicle system of claim 5, wherein the synchronized image comprises a first portion projected by the vehicle and a second portion projected by the second vehicle.

7. The vehicle system of claim 1, wherein the one or more processors are configured to project the image onto the road behind the vehicle to indicate the location of the pedestrian to the second vehicle.

8. The vehicle system of claim 1, wherein the one or more processors are configured to:
- animate the image; and
- modify an animation of the image based on the movement of the pedestrian and a location of the second vehicle.

9. The vehicle system of claim 1, wherein the one or more processors are configured to:

receive the location of the pedestrian from the second vehicle; and display information about the location of the pedestrian to a driver of the vehicle.

10. The vehicle system of claim 1, wherein the one or more processors are configured to:

determine one or more environmental conditions based on the sensor data; and transmit information about the one or more environmental conditions to the second vehicle by the vehicle-to-vehicle communication.

11. A method comprising:

receiving sensor data from one or more vehicle sensors of a vehicle as the vehicle drives along a road;

determining a location of a pedestrian based on the sensor data;

performing vehicle-to-vehicle communication with a second vehicle indicating the location of the pedestrian;

projecting an image onto the road based on the location of the pedestrian such that the image spans a width of the road;

determining movement of the pedestrian; and as the pedestrian crosses the road, modifying the image being projected onto the road based on the movement of the pedestrian such that the modified image only spans a portion of the width of the road that the pedestrian has not crossed.

12. The method of claim 11, wherein the image indicates a path for the pedestrian to cross the road.

13. The method of claim 11, wherein the image indicates that the pedestrian should not cross the road.

14. The method of claim 11, wherein the image indicates the presence of the second vehicle to the pedestrian.

15. The method of claim 11, wherein the image is a synchronized image generated by the vehicle and the second vehicle.

16. The method of claim 15, wherein the synchronized image comprises a first portion projected by the vehicle and a second portion projected by the second vehicle.

17. The method of claim 11, further comprising projecting the image onto the road behind the vehicle to indicate the location of the pedestrian to the second vehicle.

18. The method of claim 11, further comprising:

animating the image; and modifying an animation of the image based on the movement of the pedestrian and a location of the second vehicle.

19. The method of claim 11, further comprising:

receiving the location of the pedestrian from the second vehicle; and displaying information about the location of the pedestrian to a driver of the vehicle.

20. The method claim 11, further comprising:

determining one or more environmental conditions based on the sensor data; and transmitting information about the one or more environmental conditions to the second vehicle by the vehicle-to-vehicle communication.

* * * * *